United States Patent [19]

Lariscy

[11] Patent Number: 4,924,207
[45] Date of Patent: May 8, 1990

[54] VEHICLE SAFETY LIGHT ASSEMBLY

[75] Inventor: Emory L. Lariscy, Stuart, Va.

[73] Assignee: Lariscy Enterprises Inc., Patrick Springs, Va.

[21] Appl. No.: 335,838

[22] Filed: Apr. 10, 1989

[51] Int. Cl.$^5$ .............................................. B60Q 1/26
[52] U.S. Cl. ..................... 340/467; 340/464; 200/61.89
[58] Field of Search .................. 200/61.89; 340/464, 340/467, 463, 479

[56] References Cited

U.S. PATENT DOCUMENTS

| | | | |
|---|---|---|---|
| 2,452,762 | 11/1948 | Karow | 200/61.89 |
| 2,552,665 | 5/1951 | Cirone | 200/61.89 |
| 2,784,348 | 3/1957 | Danek | 340/464 |
| 3,411,134 | 11/1968 | Shames | 200/61.89 X |
| 3,414,879 | 12/1968 | Holland | 200/61.89 X |
| 3,428,767 | 2/1969 | Pfeifer | . |
| 3,501,742 | 3/1970 | Ellison | 340/467 |
| 3,761,875 | 9/1973 | Camp | 200/61.89 X |
| 3,821,701 | 6/1964 | Ross | 340/464 |
| 4,034,338 | 7/1977 | Bevilacqua | 340/464 |
| 4,280,116 | 7/1981 | Camp | 340/464 |
| 4,470,036 | 9/1984 | Doerr | . |
| 4,686,503 | 8/1987 | Miller | . |
| 4,730,181 | 3/1988 | Perkins | . |
| 4,751,493 | 1/1988 | Miller | . |

Primary Examiner—Joseph A. Orsino
Assistant Examiner—Brian R. Tumm
Attorney, Agent, or Firm—Wallace J. Nelson

[57] ABSTRACT

A rear window mounted deceleration warning light that may be housed in a single unit (46), alone or in combination with a "third" brake light and housed in a combined unit (10). The amber or yellow caution light is connected to an electric circuit independent from the circuit for the vehicle brake lights and is operable at all times when the vehicle ignition switch is in the "on" position. Upon depressing the vehicle accelerator pedal, throttle valve arm (93) on vehicle carburetor (86) is rotated to open switch (42 or 56) and cause the amber or yellow caution light to cease operation. Upon release of the accelerator pedal, throttle arm (93) again closes switch (42 or 56) to permit current to flow from the vehicle fuse block to the caution light bulb (28 or 52). A bracket (88), custom designed for each vehicle or carburetor class, serves to maintain switch (42 or 56) in position to be actuated by throttle valve arm (93).

7 Claims, 2 Drawing Sheets

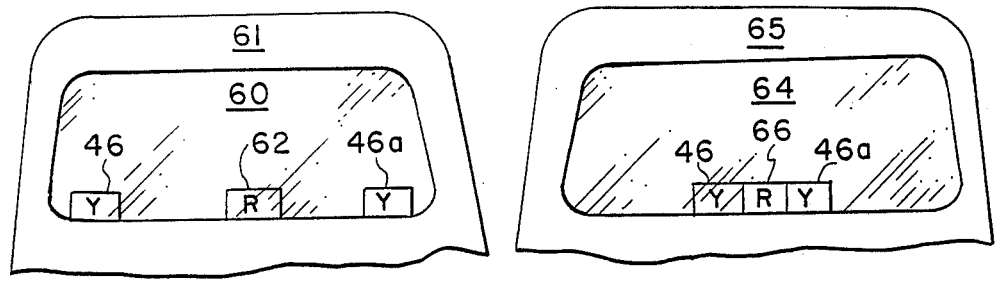
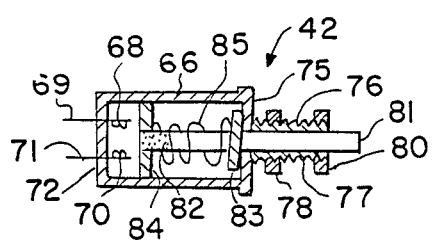
FIG. 3
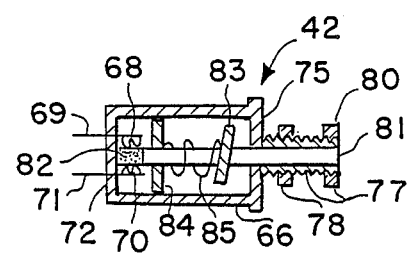
FIG. 4
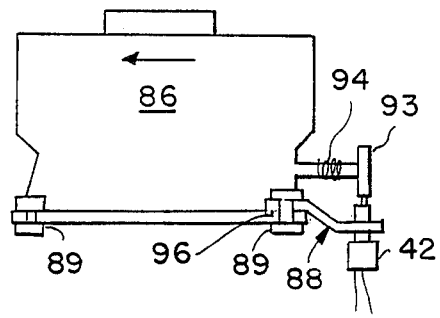
FIG. 5
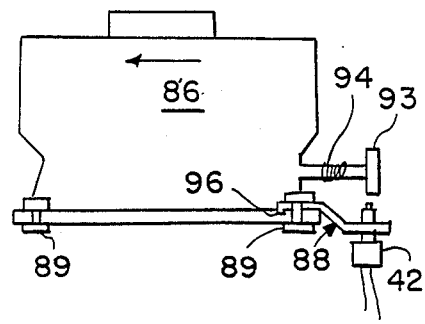
FIG. 6
FIG. 7
FIG. 8
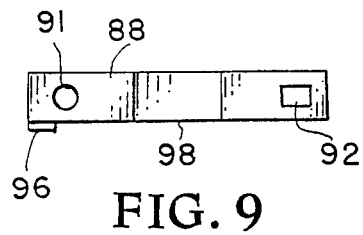
FIG. 9
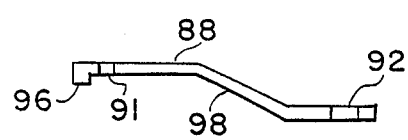
FIG. 10

VEHICLE SAFETY LIGHT ASSEMBLY

FIELD OF THE INVENTION

This invention relates generally to a vehicular safety system, and relates specifically to a braking and deceleration light warning system to alert a trailing vehicle driver that the front vehicle is decelerating and, or may be, braking.

BACKGROUND OF THE INVENTION

Rear end vehicular collisions are one of the most common accidents occurring on our road systems today and result in countless loss of money, time and sometimes, life to those involved. Although a number of systems have been proposed to alert trailing vehicle drivers of the deceleration of a lead vehicle prior to illumination of the brake lights, there remains a need for further improvement in this area.

The addition of a third eye-level brake light in the rear window of presently manufactured automobiles has, no doubt, helped to reduce the number and severity of rear end colisions. A reliable and more efficient system to alert a trailing vehicle operator that the lead vehicle is, or may be, decelerating prior to actual illumination of the vehicle brake lights could prove a valuable safety device that could further reduce the number and severity of rear end collisions now occurring.

Accordingly, it is an object of the present invention to provide an improved braking and deceleration light warning system for automotive vehicles.

Another object of the present invention is a braking and deceleration warning light system that is easy to install by the novice mechanic or vehicle owner.

A further object of the present invention is a novel deceleration warning light system that may be installed on vehicles that are already provided with rear window brake lights.

An additional object of the present invention is a novel bracket member for connecting a deceleration light switch to the carburetor of a vehicle.

Another object of the present invention is a braking and deceleration warning light kit that is economical to buy, easy to retro fit onto a vehicle and will reduce rear-end collision incidence and severity.

SUMMARY OF THE INVENTION

According to the present invention the foregoing and additional objects are attained by providing a rear window mounted combination brake and deceleration warning light housed in a single unit and connected to the vehicle brake and carburetor such that when a vehicle ignition switch is in the "on" position an amber light is activated and becomes visible in the rear window of the vehicle. When the vehicle accelerator is depressed, the electrical connection to the amber light is interrupted and it ceases to burn until the accelerator is released. When the brake pedal is depressed a red brake light in the vehicle rear window is activated, along with the regular brake lights. The amber or yellow caution light is connected to an independent circuit from the brake lights and continues to burn as long as the accelerator is not depressed as further visual indication to a trailing vehicle driver that the lead vehicle is decelerating and braking.

For vehicles already provided with a rear window mounted brake light, an amber deceleration light unit is installed on one or both sides of the brake light. When installing two amber light units they may be placed adjacent to, or spaced from, the central red brake light. The brake light in each instance is connected to the same electric system that actuates the rear mounted brake lights. The amber caution or deceleration warning light(s) is connected to a switch disposed on the vehicle carburetor and receives current from the vehicle fuse block such that the throttle valve arm on the carburetor maintains the switch closed when the vehicle ignition switch is "on" and the accelerator pedal is not depressed. When the accelerator pedal is depressed, the throttle valve arm moves out of contact with the switch to permit spring actuated opening thereof. Opening of the switch interrupts the current flow to the amber deceleration light causing it to go out.

BRIEF DESCRIPTION OF THE DRAWINGS

A more complete appreciation of the invention and many of the attendant advantages thereof will be more readily apparent as the same becomes better understood in reference to the following detailed description when considered in reference to the accompanying drawings wherein:

FIG. 3 is a schematic view illustrating the use of two caution light units shown in FIG. 2 and disposed in spaced relationship to a vehicle third brake light;

FIG. 4 is a view similar to FIG. 3 illustrating the use of two caution light units as shown in FIG. 2 and disposed in opposite juxtaposition to a vehicle third brake light;

FIG. 5 is an enlarged part sectional view of the switch employed in FIG. 1 in the open or interrupted current flow position;

FIG. 6 is a view similar to FIG. 5 illustrating the switch in the closed position;

FIG. 7 is a schematic view of the switch and bracket attachment to a vehicle carburetor and illustrating the switch in closed position;

FIG. 8 is a view similar to FIG. 7 illustrating the throttle valve arm rotated away from the switch to permit the switch to open;

FIG. 9 is a top view of the bracket for attaching the switch to the carburetor in FIGS. 7 and 8; and FIG. 10 is a side view of the bracket shown in FIG. 9.

DETAILED DESCRIPTION

Figure 1:
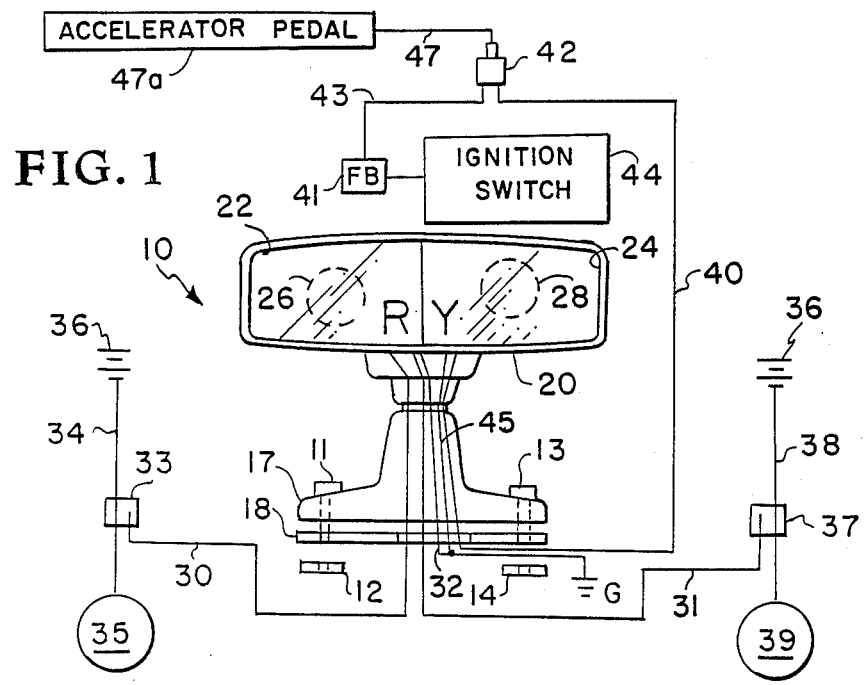
FIG. 1 is a part schematic view of the preferred embodiment of the present invention and illustrating a brake and a caution light disposed in a single housing.

Referring now to the drawings and more particularly to FIG. 1, a combination braking and deceleration warning light system is schematically shown and designated generally be reference numeral 10. Light system 10 is adapted to be installed in the rear window deck area of an automobile as close as possible or practicable to the window. A pair of bolts 11,13 extend through openings 15,16 in opposite sides of base 17 of light system 10. Bolts 11,13 extend through pre-drilled holes (using base 17 as a template) in the rear window deck (not shown). A flat mounting plate 18 is positioned beneath the deck to receive bolts 11,13 and permit internally threaded nuts 12,14 to threadingly connect to bolts 11,13, while bearing thereagainst, and serving as a rigid attachment for light system 10. A center hole is also drilled in the rear window deck (and provided in flat mounting plate 18) to permit the wires leading to light system 10 to be threaded therethrough in a conventional manner.

Light system 10 includes a unitary housing 20 divided into two compartments 22,24 with electric light bulbs 26,28 being mounted, respectively, therein. Compartment 22 is closed at the front thereof by a red lens, as designated by the letter R and compartment 24 is closed at the front thereof by a yellow or amber lens designated by the letter Y.

A pair of lead wires 30,31 electrically extend from one side of bulb 26 and a ground wire 32 electrically extends from the other side of bulb 26 to connect with or ground the bulb to the vehicle chassis, and as designated by the letter G. Wire 30 connects with a first connector element 33 to electrically connect bulb 26 to the power wire 34 leading to first brake light 35 on one side of the vehicle. Wire 31 connects with a second connector element 37 to electrically connect bulb 26 to power wire 38 leading to second brake light 39. Second brake light 39 is on the vehicle side opposite to brake light 35. Power or hot wires 34 and 38 serve to provide electrical power from battery source 36 to brake lights 35 and 39 in a conventional manner. By supplying power to bulb 26 from both wires 34 and 38 it is ensured that, in the event the power supply to either of brake lights 35 or 39 is interrupted, the power supply to the other brake light will still supply power to bulb 26.

Lead wire 40 electrically extends from one side of bulb 28 and connects to one side of an on-off switch 42. Another lead wire 43 extends from the other side of switch 342 and connects to the "on" side of the ignition switch 44 at the vehicle fuse block 41 such that power is supplied to switch 42 when the vehicle ignition switch is in the "on" position. Switch 42 is actuated via linkage 47 by movement of accelerator pedal 47a, as will be further explained hereinafter. A ground wire 45 electrically leads from the other side of bulb 28 to connect with and ground the bulb to the vehicle chassis, as described hereinabove for grounding of bulb 26. The circuit for bulb 28 is completely independent from that for bulb 26 and continues to operate even if the circuit to the brake lights fails.

The invention described in reference to the preferred embodiment of FIG. 1 may be installed on vehicles having no rear window mounted third brake light or on vehicles where the third brake light is removed prior to installation of light system 10.

Figure 2:
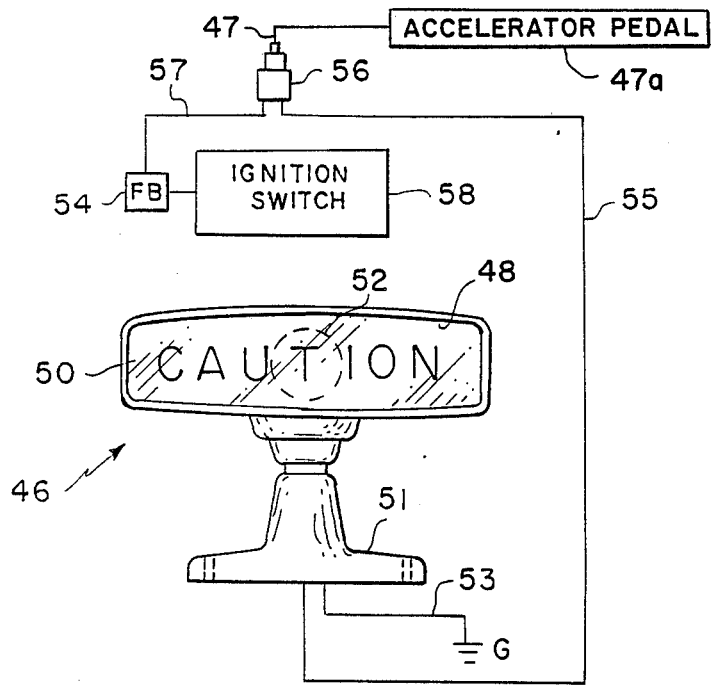
FIG. 2 is a part schematic view similar to FIG. 1 illustrating a caution light alone.

Referring now more particularly to FIG. 2 an alternate embodiment of the invention employing a deceleration warning light system alone is shown and designated by reference numeral 46. As shown therein, deceleration light system 46 includes a housing having a single compartment 48 closed at the front thereof by a yellow or amber lens 50. The word "CAUTION", formed of black letters, is disposed on lens 50. The base 51 of light system 46 and the connection thereof to the rear window deck is essentially identical to that described hereinbefore in reference to FIG. 1 and will not be repeated here, in the interest of brevity.

A single bulb 52 (shown in dotted line) is disposed within housing compartment 48 behind lens 50. A ground wire 53 electrically extends from one side of bulb 52 to connect with or ground the bulb to the vehicle chassis and as designated by the letter G. A lead wire 55 electrically extends from the other side of bulb 52 and connects to one side of an on-off switch 56.

Another lead wire 57 leads from the other side of on-off switch 56 and connects to vehicle ignition switch 58 at the vehicle fuse block 54 such that power is supplied to switch 56 when vehicle ignition switch 58 is in the "on" position, as in the previously described embodiment.

Referring now more particularly to FIGS. 3 and 4, different arrangements for the braking and deceleration warning system of the present invention are illustrated. In FIG. 3 a schematic view looking into the rear window 60 of a vehicle 61 is shown. In this arrangement it is assumed that vehicle 61 is provided with a third brake light 62 disposed at or near the center of rear window 60. Light 62 is provided with a red lens R may be factory or individually installed from various kits available in the market. Two deceleration warning light systems 46,46a, as described hereinabove in reference to FIG. 2, are then installed adjacent the ends of rear window 60. Light units 46,46a are each provided with a yellow or amber lens Y. Thus, when the driver of vehicle 61 decelerates his vehicle, and prior to applying the brakes, deceleration warning lights 46,46a would be activated to give timely warning to a trailing driver that vehicle 61 is decelerating and permit him to take appropriate action.

In FIG. 4, looking into the rear window 64 of a vehicle 65, a center third brake light 66 is shown having a pair of deceleration warning light systems or units 46,46a disposed in juxtaposition on each side thereof. As in the embodiment of FIG. 3, the deceleration light units 46,46a are each provided with a yellow or amber lens Y while the third brake light 66 is provided with a red lens R.

Referring now more particularly to FIGS. 5 and 6 details of an exemplary on-off switch 42 will now be described. Switch 42 (FIG. 1) and switch 56 (FIG. 2) are of identical construction and operation and only one is described in the interest of brevity. Switch 42 includes a housing 66 having a pair of electrical contacts 68,70 disposed in spaced relationship adjacent an end thereof. A pair of electrical plugs or leads 69,71 extend from respective contacts 68,70 through an end wall 72 of housing 66. The other end 75 of housing 66 is provided with a central opening with a tubular extension 76 integrally connected to and extending therefrom. Tubular extension 76 is provided with external threads 77 along the length thereof with a pair of nuts 78, 80 threadingly positioned thereon.

A slidable plunger 81, having an electrically conductive surface 82 encircling and disposed along a length of one end thereof, slidably extends through tubular extension 76 and extends into housing 66. Plunger 81 has an integrally attached annular ring 83 at substantially the mid-length thereof and is positioned within the interior of switch housing 66. A circular disk 84 is integrally secured to the interior surface of housing 66 adjacently spaced from end 72 thereof. A spiral spring 85 is disposed between annular ring 83 and disk 84 and serves to normally bias plunger 81 such that conductive surface 82 thereon is spaced from electric contacts 68,70 and the other end of plunger 81 is extended from tubular extension 76, as illustrated in FIG. 5. When the end of plunger 81 extending from tubular extention 76 is forced within tubular extension 76, annular ring 83 on plunger 81 compresses spring 85 against disk 84 and permits conductive surface 82 on plunger 81 to enter the space between, and engage, electrical contacts 68,70 to permit current flow between electric leads or plug elements 69,71. This conductive condition for switch 42 is illustrated in FIG. 6.

Referring now more particularly to FIGS. 7-10 the details of the connection of switch 42 to a vehicle carburetor will now be described. FIGS. 7 and 8 illustrate a schematic representation of a vehicle carburetor connection for switch 42 with the front of the vehicle being in the direction of the arrow shown on a carburetor 86. As shown therein, an elongated mounting bracket 88 having one end thereof secured to carburetor 86 by one of the carburetor mounting bolts 89. This is readily accomplished by removing one of the mounting bolts 89 and positioning bracket 88 on the carburetor such that bolt 89 passes through an opening 91 (FIGS. 9 and 10) provided in one end of bracket 88.

Switch 42 is secured to the opposite end of mounting bracket 88 by removing nut 80 (FIGS. 5-6), inserting tubular extension 76 through slotted opening 92 of bracket 88 and reattaching nut 80 thereon. The distance tubular extension 76 extends through bracket 88 is adjusted by backing off, or moving forward, nut 78 on tubular extension 76. Switch 42 is positioned relative to throttle valve arm 93 such that the end of slidable plunger 81 is depressed against the open end of tubular extension 76, as illustrated in FIGS. 6 and 7, when the vehicle accelerator pedal 47a (FIG. 1) is not depressed. That is, throttle valve arm 93, through spring 94, exerts sufficient pressure on the end of plunger 81 to cause spring 85 to be compressed sufficiently to permit conductive surface end 82 to close the electric contacts 68,70. Closing of contacts 68,70 closes the circuit described in reference to FIGS. 1 and 2 and ignite bulb 28 (FIG. 1) or bulb 52 (FIG. 2). When the vehicle accelerator pedal 47a is depressed, throttle valve arm 93 rotates against the force of spring 94 to move out of contact with plunger 81, as illustrated in FIG. 8. In this position, spring 85 moves plunger 81 from the position shown in FIG. 6 to that shown in FIG. 5 and current no longer flows through contacts 68,70 and bulb 28 (or 52) is turned off.

As shown more clearly in FIGS. 9 and 10, bracket 88 is an angular bent, elongated, strip of metal having a bore 91 through one end for attachment to carburetor 86, and a slot opening 92 at the other end thereof. Slotted opening 92 permits linear adjustment of switch 42 (via tubular extension 76) to ensure that plunger 81 therein is in correct position to contact throttle valve arm 93. An overhang or lip extension 96 is provided on the side of bracket 88 adjacent to the end thereof having bore 91. Lip 96 rests against carburetor 86 and assists in preventing rotative movement of bracket 88 relative thereto under the influence of pressure from throttle valve arm 93.

Specific dimensions for an exemplary bracket 88 employed on a specific vehicle included a width of one inch and a length of three and one-fourth inches. Bore 91 in this specific embodiment has a diameter of one-quarter inch and slot 92 is one-half inch wide and three-quarters inch long. As shown in FIG. 10, the straight section having bore 91 therein is one inch long, the straight section having slot 92 therein is one and one-half inches long, and the intermediate bent or angular section 98 is three-quarters of an inch long. The width of slot 92 is governed by the diameter of extension 76 on switch 42 (or 56).

Although the present invention may be factory installed, at the present time it is primarily intended to be sold in kit form with the purchaser doing his own installation. Each such kit would be designated for a specific vehicle or class of vehicles and the exact dimensions for bracket 88 may vary for different vehicle classes or engines. Thus, the exact dimension for bracket 88 would be custom designed for the specific vehicle or class of vehicles for a specific kit. Also, explicit instructions for the simple steps involved in attaching the kit components to a vehicle would be packaged in each kit.

Also, although the invention has been specifically described relative to having switch 42 (and 56) actuated by a throttle valve arm, the invention is also applicable to fuel injection systems wherein the switch is connected to be actuated by the throttle valve housing stop thereon.

For kit applications, the ground wires leading from brake light bulb 26, and deceleration light bulbs 28 and 52, would conventionally be black, while the lead or power wires for the brake light bulb 26 may be red, and those for deceleration light bulbs 28 and 52 green.

Although only the embodiment of FIG. 2 illustrates the legend "CAUTION" on the lens, obviously this legend could be applied to the yellow or amber lenses of the other embodiments, if so desired. Also, the legend "STOP" may be applied to the red lenses, if desired.

The light bulb in each light disclosed herein may be any standard or heavy duty tail light bulb such as General Electric 1034, 1156, 1157 or equivalent. Also, where the disclosure refers to electric leads extending from the respective bulbs, it is to be understood that conventional bulb fittings and contacts are inferred and the details of which are omitted in the interest of clarity and brevity.

Although the invention has been described relative to specific embodiments thereof, it is not so limited and there are numerous variations and modifications thereof that will be readily apparent to those skilled in the art in the light of the above teachings. For example, although the specific embodiments described herein position the deceleration light(s) in the vehicle rear window, it is to be understood that these lights may be mounted at other positions external to the rear window as so desired.

It is therefore to be understood that, within the scope of the appended claims, the invention may be practiced other than as specifically described.

What is claimed as new and desired to be secured by letters patent of the United States is:

1. A combination braking and deceleration warning light system for timely warning the driver of a trailing vehicle of the deceleration and braking actions of a lead vehicle driver, comprising:

a unitary lamp housing adapted to be installed at the rear area of a vehicle;

said lamp housing having a first and a second separate compartment, a first electric light bulb mounted in said first separate compartment and a second electric light bulb mounted in said second separate compartment, a red lens closing the front of said first compartment and an amber lens closing the front of said second compartment, said first electric light bulb in said first compartment having a pair of lead wires for electrically connecting said bulb to a brake power line leading to each of the vehicle brake lights, and a ground wire for grounding said first electric light bulb to the vehicle chassis, said second electric light bulb having a ground wire and a lead wire extending therefrom, said ground wire serving to ground said second bulb to the vehicle chassis, a switch member mounted on the carburetor of the vehicle, said lead wire extending from said second electric light bulb being in electrical connection with said switch member, said switch member having a first electrical contact connected to said lead wire extending from said second bulb and a second electrical contact connected to the vehicle fuse box such that current is received from the fuse box when the vehicle ignition switch is in the "on" position, said switch member being mounted adjacent to the throttle valve arm leading to the vehicle carburetor such that when the throttle valve arm is in position to maintain the throttle valve closed, said switch will be in contact with the throttle valve arm and maintained in the closed position causing said second light bulb to burn and when the throttle valve is opened, movement of the throttle valve arm out of contact with said switch member permits said switch member to open and interrupt the current flow to said second bulb causing said second bulb to cease burning, and an elongated bracket member having a first end attached to the carburetor of the vehicle and a second end having adjustable means thereon for linear, adjustable, attachment of said switch member thereto, said elongated bracket member serving to mount said switch member adjacent to the throttle valve arm, said adjustable means including a slotted opening disposed adjacent said second end of said elongated bracket, a threaded terminus on said switch member positioned within said slotted opening, and a nut threadingly positioned on said threaded terminus to engage said bracket and maintain said switch member in relative fixed position along the length of the slotted opening of said bracket.

2. The braking and deceleration warning light system of claim 1 wherein said switch member includes a switch housing, a tubular extension extending from said switch housing, an elongated plunger slidably disposed within said tubular extension, said elongated plunger having a first end extending from said tubular extension when said switch member is in open position and said first end being forced into said tubular extension by said throttle valve arm to close said switch member and permit current flow therethrough when the vehicle accelerator pedal is not depressed, a pair of spaced electrical contacts disposed within said switch housing, a conductive surface provided on a second end of said elongated plunger, said second end of said elongated plunger being moved between and in engagement with said pair of electrical contacts to close said switch member when said plunger is forced into said tubular extension by said throttle valve arm.

3. The braking and deceleration warning light system of claim 2 wherein said switch member also includes spring means disposed within said switch housing and around a portion of the length of said elongated plunger, said spring means serving to force said elongated plunger to slidably move and separate from said spaced contacts when the force exerted thereon by said throttle valve arm is removed.

4. A deceleration warning light system for alerting a trailing vehicle operator that the lead vehicle is decelerating and operable prior to illumination of the lead vehicle brake lights comprising:

at least one light housing unit attached adjacent to and visible from the rear of a vehicle, an amber lens and a light bulb disposed in said at least one light housing unit, said light bulb being electrically grounded to the vehicle chassis and provided with a first lead wire electrically connected to one side of a switch member, an elongated bracket member having a first end attached to the carburetor of the vehicle and a second end adjustably supporting said switch member, said second end of said elongated bracket member having a slotted opening therein to permit linear adjustable attachment of said switch member thereto, said switch member having a threaded terminus extending through said elongated bracket member, a slidable on-off plunger, slidably positioned through said threaded terminus, said threaded terminus extending through said slotted opening of said elongated bracket member and a threaded nut positioned on said threaded terminus to provide linear and axial adjustment of said switch member relative to said bracket member, said slidable on-off plunger being disposed in contacting relationship to the vehicle throttle valve arm when the vehicle accelerator pedal is not depressed wherein said plunger will be forced to the "on" position to permit current to flow through said switch member, a second lead wire extending from said switch member and connected to the vehicle fuse block such that when the vehicle ignition switch is in the "on" position that current will be provided to said switch member, whereby when the vehicle ignition switch is "on" current will flow to said switch member and when said switch member is also "on" current is supplied to said light bulb and ignites same, and when the switch member is in the "off" position, caused by rotating the throttle valve arm, no current will be supplied to said bulb and it will not be burning.

5. The deceleration light warning system of claim 4 wherein a third brake light is provided at the substantial center bottom area of a vehicle rear window and a pair of deceleration light housing units are employed and said pair of light housing units being positioned, one each, at the opposite sides of the vehicle rear window.

6. The deceleration light warning system of claim 4 wherein a third brake light is provided at the substantial center bottom area of a vehicle rear window and a pair of deceleration light housing units are provided juxtapositionally disposed relative to said third brake light.

7. The deceleration light warning system of claim 4 wherein said at least one deceleration light housing unit comprises a single housing unit divided into two juxtapositioned compartments, a first of said two compartments housing an additional light bulb and closed by a red lens, and a second of said two compartments housing said amber lens and said bulb therefor, and said additional light bulb being in electrical connection through a separate circuit with the vehicle brake lights.

* * * * *